(12) United States Patent
Otsuka

(10) Patent No.: US 11,584,055 B2
(45) Date of Patent: Feb. 21, 2023

(54) TWO-COLOR MOLDING DIE, MANUFACTURING METHOD OF TWO-COLOR MOLDED ARTICLE, AND IMAGING DEVICE INCLUDING OPTICAL FUNCTIONAL COMPONENTS

(71) Applicant: OLYMPUS CORPORATION, Hachioji (JP)

(72) Inventor: Masaki Otsuka, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 598 days.

(21) Appl. No.: 16/657,746

(22) Filed: Oct. 18, 2019

(65) Prior Publication Data

US 2020/0047383 A1 Feb. 13, 2020

Related U.S. Application Data

(63) Continuation of application No. PCT/JP2018/016207, filed on Apr. 19, 2018.

(30) Foreign Application Priority Data

Apr. 21, 2017 (JP) .............................. JP2017-084758

(51) Int. Cl.
*B29C 45/26* (2006.01)
*B29C 45/04* (2006.01)
(Continued)

(52) U.S. Cl.
CPC ...... *B29C 45/2681* (2013.01); *B29C 45/0441* (2013.01); *B29C 45/1615* (2013.01);
(Continued)

(58) Field of Classification Search
None
See application file for complete search history.

(56) References Cited

U.S. PATENT DOCUMENTS

2003/0070257 A1 4/2003 Takahashi et al.
2006/0012749 A1 1/2006 Ai

FOREIGN PATENT DOCUMENTS

CN 1681635 A 10/2005
JP H09108174 A 4/1997
(Continued)

OTHER PUBLICATIONS

Machine translation of JP H09-108174 A. (Year: 1997).*
International Search Report (ISR) dated Jun. 19, 2018 issued in International Application No. PCT/JP2018/016207.

*Primary Examiner* — Ramsey Zacharia
(74) *Attorney, Agent, or Firm* — Holtz, Holtz & Volek PC

(57) ABSTRACT

A two-color molding die includes: a fixed primary die; a fixed secondary die; and a movable die. The fixed primary die includes a first concave portion. The movable die includes a second concave portion facing the first concave portion, and a core pin that protrudes from a base end surface of the second concave portion toward a base end surface of the first concave portion to form a tubular primary molding cavity between the core pin and the first concave portion and the second concave portion. The fixed secondary die includes a third concave portion configured to form a concave secondary molding cavity.

1 Claim, 10 Drawing Sheets

(51) Int. Cl.
  *B29C 45/16* (2006.01)
  *B32B 1/00* (2006.01)
  *B32B 7/023* (2019.01)
  *B32B 27/08* (2006.01)
  *G02B 1/04* (2006.01)
  *B29L 31/34* (2006.01)

(52) U.S. Cl.
  CPC .............. *B29C 45/261* (2013.01); *B32B 1/00* (2013.01); *B32B 7/023* (2019.01); *B32B 27/08* (2013.01); *G02B 1/041* (2013.01); *B29L 2031/3475* (2013.01); *B32B 2307/4026* (2013.01); *B32B 2551/00* (2013.01)

(56) References Cited

FOREIGN PATENT DOCUMENTS

| | | |
|---|---|---|
| JP | H09174599 A | 7/1997 |
| JP | 2003195111 A | 7/2003 |
| JP | 2004053879 A | 2/2004 |

* cited by examiner

TWO-COLOR MOLDING DIE, MANUFACTURING METHOD OF TWO-COLOR MOLDED ARTICLE, AND IMAGING DEVICE INCLUDING OPTICAL FUNCTIONAL COMPONENTS

CROSS-REFERENCE TO RELATED APPLICATION

This application is a continuation of PCT International Application No. PCT/JP2018/016207 filed on Apr. 19, 2018, which designates the United States, incorporated herein by reference, and which claims the benefit of priority from Japanese Patent Application No. 2017-084758, filed on Apr. 21, 2017, incorporated herein by reference.

BACKGROUND

1. Technical Field

The present disclosure relates to a two-color molding die, a manufacturing method of two-color molded article, and an imaging device including optical functional components.

2. Related Art

In the related art, two-color molded articles having a transparent portion, such as display panel components, are used in electrical appliances with the aim of reducing the assembly cost and achieving enhancement in the esthetics. However, in the case in which primary molding of a colored resin (a primary molding resin) is performed first and then secondary molding of a transparent resin (a secondary molding resin) is performed, the shear stress attributed to the transparent resin acts on the primary molding portion thereby resulting in a phenomenon called dye bleeding (a resin flow phenomenon) in which the colored resin in the surface layer of the primary molding portion undergoes re-melting and becomes fluid. As a result, the colored resin blocks some of the secondary molding portion of a transparent color, thereby resulting in the loss of transparency of the secondary molding portion.

Regarding such issues, for example, in Japanese Patent Application Laid-open No. 09-174599, a method is proposed in which, with the aim of molding a panel in which the colored primary molding portion does not seep into the transparent second molding portion at the time of secondary molding, the primary molding portion is formed using a primary molding cavity die (a fixed die) and a core die (a movable die) that has a protrusion formed on the display portion of the panel; and then the secondary molding portion is formed in an integrated manner.

SUMMARY

In some embodiments, a two-color molding die includes: a fixed primary die; a fixed secondary die; and a movable die. The fixed primary die includes a first concave portion, the movable die includes a second concave portion facing the first concave portion, and a core pin that protrudes from a base end surface of the second concave portion toward a base end surface of the first concave portion to form a tubular primary molding cavity between the core pin and the first concave portion and the second concave portion, when the movable die is closed with respect to the fixed primary die, a colored primary molding resin is filled into the primary molding cavity to form a tubular primary molded article, when the movable die is opened with respect to the fixed primary die after forming the primary molded article, the core pin is configured to hold the primary molded article that has been released from the fixed primary die, the fixed secondary die includes a third concave portion configured to form a concave secondary molding cavity in which a distal end portion of the primary molded article and the core pin that includes an apical surface protruding from an open end of the primary molded article are covered by the third concave portion when the movable die in which the primary molded article is held is closed with respect to the fixed secondary die, the secondary molding cavity being formed between the third concave portion and the distal end portion of the primary molded article and the core pin, the distal end portion of the primary molded article including the open end of the primary molded article, and when the movable die is closed with respect to the fixed secondary die, a secondary molding resin that is of transparent color is filled into the secondary molding cavity to form a secondary moldable article in which an optical functional surface transferred due to the apical surface of the core pin.

In some embodiments, provided is a manufacturing method of a two-color molded article using a two-color molding die that includes a fixed primary die, a fixed secondary die, and a movable die. The method includes: closing the movable die with respect to the fixed primary die; filing a colored primary molding resin into a tubular primary molding cavity to form a tubular primary molded article, the primary molding cavity being formed between a first concave portion of the fixed primary die and a second concave portion and a core pin of the movable die; closing the movable die in which the primary molded article is held by the core pin with respect to the fixed secondary die; and filling a secondary molding resin that is of transparent color into a concave secondary molding cavity to form a secondary molded article in which an optical functional surface is transferred due to an apical surface of the core pin protruding from an open end of the primary molded article, the concave secondary molding cavity being formed between a third concave portion of the fixed secondary die and a distal end portion of the primary molded article and the core pin, the distal end portion of the primary molded article including the open end of the primary molded article.

In some embodiments, an imaging device includes an optical functional component including a secondary molded article in which a tubular portion of a primary molded article that has been formed by a non-optical functional resin is covered by an optical functional resin, the optical functional component including an optical functional area formed from an optical functional surface at distal end side of the tubular portion to an outer surface of the secondary molded article, wherein a thickness of a distal end of the tubular portion is equal to or greater than one time of a distance between a distal end of an inner radius portion of the tubular portion and an inside effective diameter of the optical functional surface.

The above and other features, advantages and technical and industrial significance of this disclosure will be better understood by reading the following detailed description of presently preferred embodiments of the disclosure, when considered in connection with the accompanying drawings.

DETAILED DESCRIPTION

Exemplary embodiments of a two-color molding die, a manufacturing method of two-color molded article, and an imaging device including optical functional components according to the disclosure are described below with reference to the accompanying drawings. However, the disclosure is not limited by the embodiments described below, and the constituent elements according to the embodiments described below include constituent elements that are replaceable and simple for a person skilled in the art or include substantively identical constituent elements. In the embodiments according to the disclosure, a two-color molded article represents an optical functional component in an imaging device, and more particularly represents a side frame in an endoscope.

First Embodiment

Figure 1:
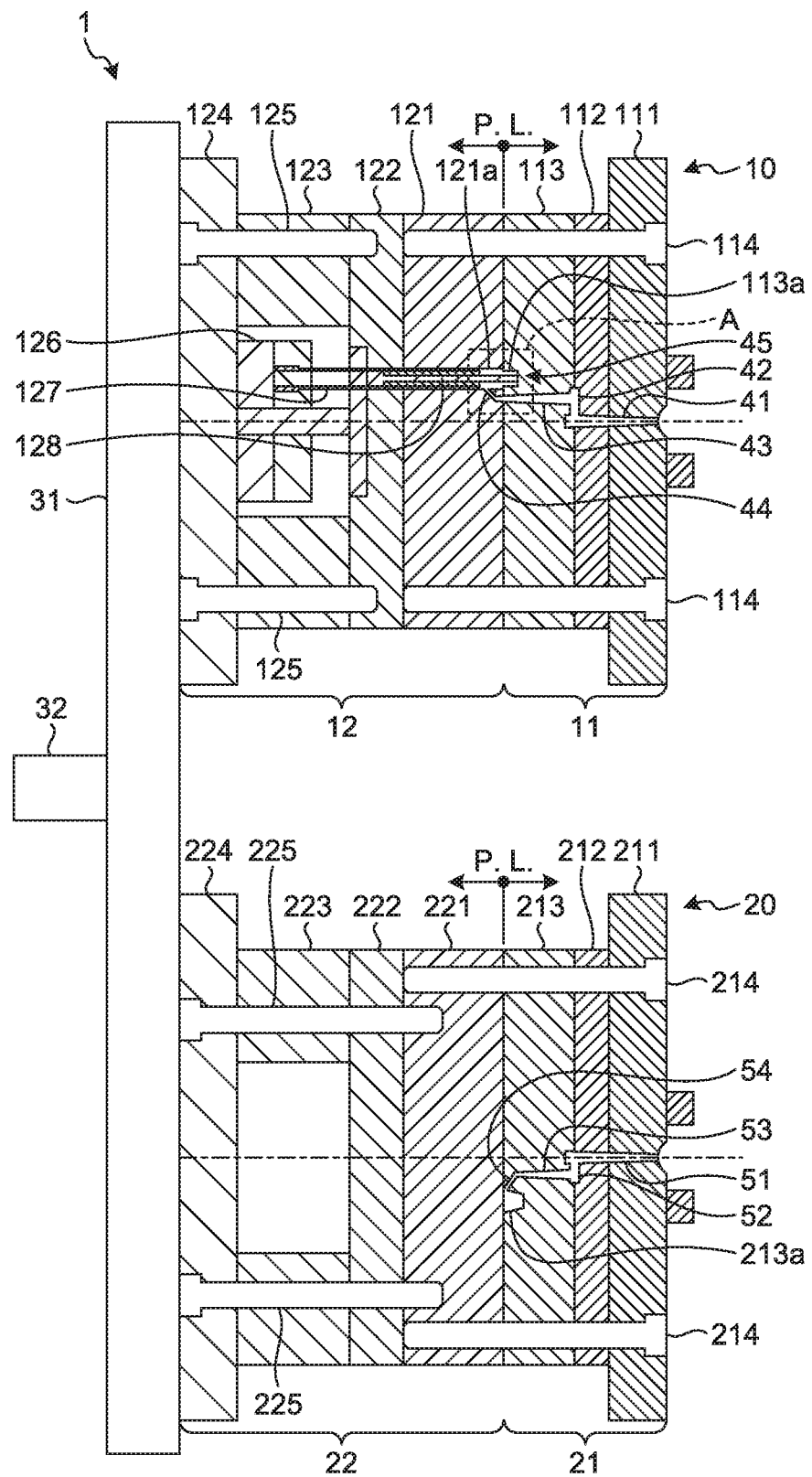
FIG. 1 is a cross-sectional view illustrating a configuration of a two-color molding die according to a first embodiment of the disclosure.

Firstly, explained below with reference to FIG. 1 is a configuration of a two-color molding die 1 according to a first embodiment of the disclosure. In FIG. 1 is illustrated the state of mold closing of the two-color molding die 1.

The two-color molding die 1 is attached to a two-color molding machine (not illustrated) in alignment with the positions of a primary injection nozzle and a secondary injection nozzle of the two-color molding machine. As illustrated in FIG. 1, the two-color molding die 1 includes a primary molding die 10 and a secondary molding die 20. The primary molding die 10 includes a fixed primary die 11, and includes a movable die 12 that is disposed to face the fixed primary die 11 across a parting line (hereinafter, called "P. L."). The secondary molding die 20 includes a fixed secondary die 21, and includes a movable dummy die 22 that is disposed to face the fixed secondary die 21 across the P. L.

The movable die 12 and the movable dummy die 22 are supported by a movable platen 31, and are configured to be movable in the opening-closing direction with respect to the fixed primary die 11 and the fixed secondary die 21 due to the movable platen 31. Moreover, the movable die 12 and the movable dummy die 22 are configured to be able to change their positions in response to the rotational movement of the movable platen 31 around a rotation axis 32. That is, when the movable platen 31 rotationally moves around the rotation axis 32 by 180°, the movable die 12 moves from the position facing the fixed primary die 11 to the position facing the fixed secondary die 21, and the movable dummy die 22 moves from the position facing the fixed secondary die 21 to the position facing the fixed primary die 11.

The fixed primary die 11 mainly includes a mount plate 111, a fall plate 112, a fixed primary-side die plate 113, and a pair of guide pins 114. Moreover, the fixed primary die 11 has a primary sprue 41, a runner 42, a secondary sprue 43, and a gate 44 formed therein. The fixed primary-side die plate 113 has a concave portion (a first concave portion) 113a formed on the face facing a movable-side die plate 121. In a primary molding process (described later), the concave portion 113a constitutes a primary molding cavity 45.

The movable die 12 mainly includes the movable-side die plate 121, a backing plate 122, a spacer block 123, a mount plate 124, a pair of fastening bolts 125, an ejector plate 126, an elector pin. 127, and a core pin 128. Moreover, the movable-side die plate 121 has a concave portion (a second concave portion) 121a that is formed on the face facing the fixed primary-side die plate 113 to face the concave portion 113a. In the primary molding process (described later), the concave portion 121a forms the primary molding cavity 45.

The core pin 128 is disposed between the concave portion 121a of the movable-side of plate 121 and the concave portion 113a of the fixed primary-side die plate 113; and constitutes the tubular primary molding cavity 45 between the core pin 128 and the concave portions 113a and 121a. Moreover, the core pin 128 is embedded into the backing plate 122 so as to maintain the relative position with respect to the movable-side die plate 121 throughout the molding process of two-color molded articles (throughout the primary molding process and a secondary molding process).

The fixed secondary die 21 mainly includes a mount plate 211, a fall plate 212, a fixed secondary-side die plate 213, and a plurality of guide pins 214. Moreover, the fixed secondary die 21 has a primary sprue 51, a runner 52, a secondary sprue 53, and a gate 54 formed thereon. The fixed secondary-side die plate 213 has a concave portion (a third concave portion) 213a formed on the face facing a movable dummy-side die plate 221. In the secondary molding process (described later), the concave portion 213a forms a secondary molding cavity 55 (see FIG. 4).

The movable dummy die 22 mainly includes the movable dummy-side die plate 221, a backing plate 222, a spacer block 223, a mount plate 224, and a pair of fastening bolts 225.

Manufacturing Method of Two-Color Molded Article

Explained below with reference to FIGS. 2 to 6 is explained the manufacturing method of a two-color molded article using the two-color molding die 1. The manufacturing method of a two-color molded article includes the first molding process and the second molding process. Meanwhile, in the first embodiment, a primary molded portion of the two-color molded article that is formed as a result of performing the primary molding process is defined as a "primary molded article", and a secondary molded portion of the two-color molded article that is formed as a result of performing the secondary molding process is defined as a "secondary molded article".

Primary Molding Process

Figure 2:
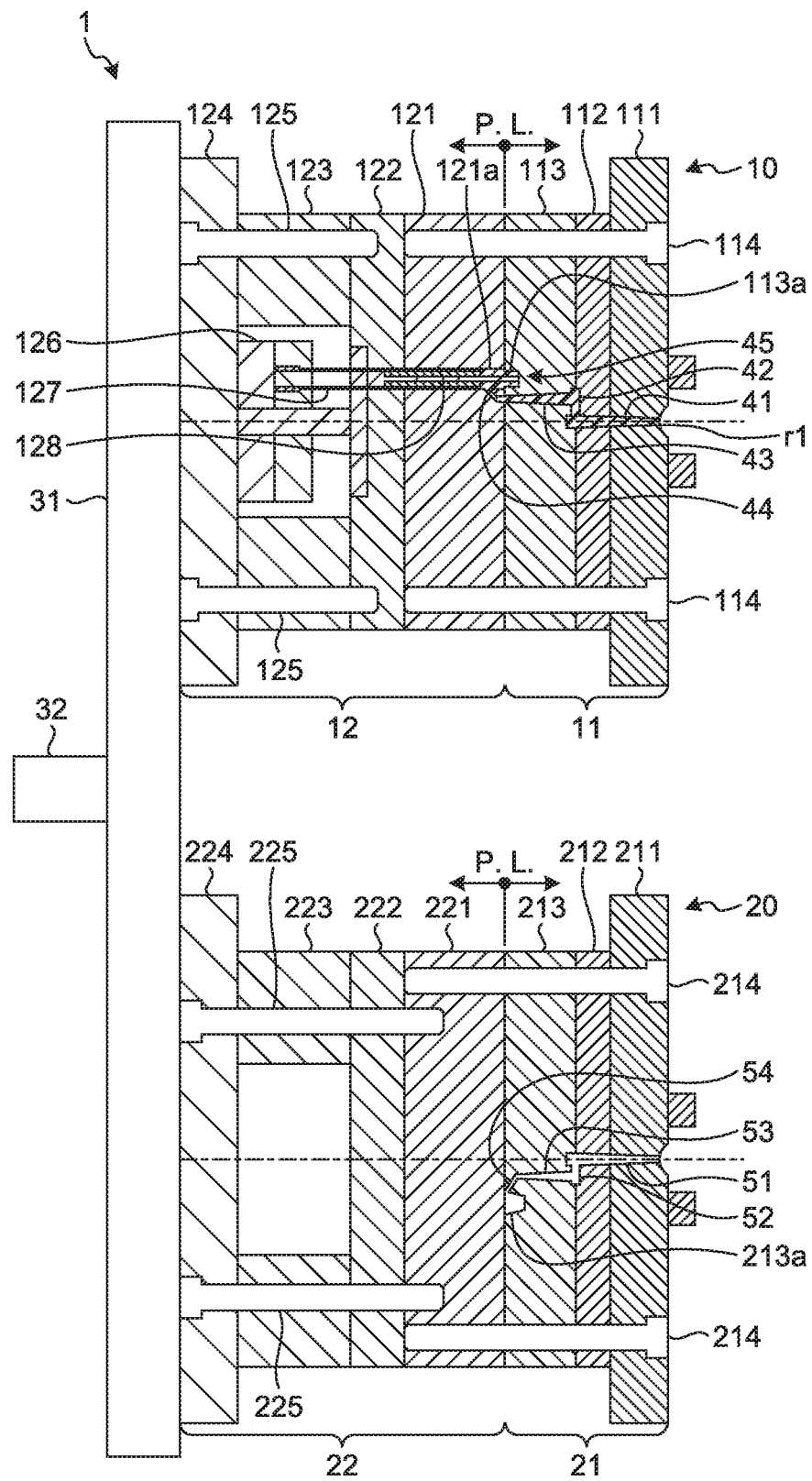
FIG. 2 is a cross-sectional view illustrating a state in which a primary molding resin is filled in a primary molding cavity during a primary molding process of a manufacturing method of two-color molded article using the two-color molding die according to the first embodiment of the disclosure.

Firstly, as illustrated in FIG. 2, in the mold-closed state of the two-color molding die 1, in the primary molding cavity 45 that is formed by the fixed primary-side die plate 113, the movable-side die plate 121, and the core pin 128, a colored primary molding resin r1 is filled through the primary sprue 41, the runner 42, the secondary sprue 43, and the gate 44 of the fixed primary die 11. As the primary molding resin r1, for example, a colored resin obtained as a result of opaque coloring of polycarbonate (PC) can be used. Regarding the details of the primary molding cavity 45, the explanation is given later (see FIG. 7).

Figure 3:
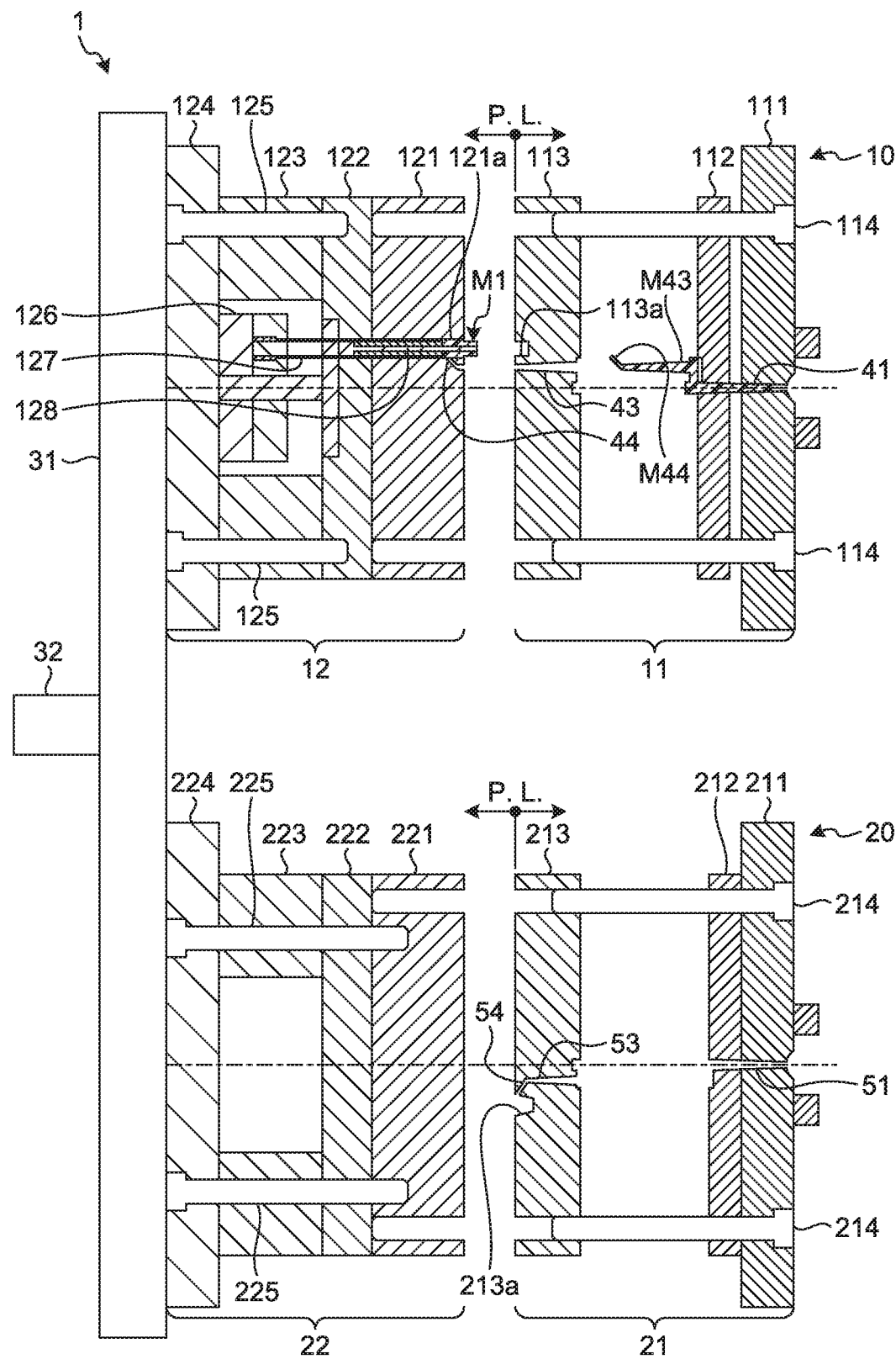
FIG. 3 is a cross-sectional view illustrating a state in which mold opening is performed during the primary molding process of the manufacturing method of two-color molded article using the two-color molding die according to the first embodiment of the disclosure.

Then, as illustrated in FIG. 3, mold opening of the two-color molding die 1 is performed. As a result, the colored primary molding resin r1 that is filled in the primary molding cavity 45 is separated into a primary molded article M1, which is held on the core pin 128 of the movable die 12, and a primary molding sprue portion M43 and a primary molding gate portion M44 that are held in the fixed primary die 11. The primary molded article M1 that is released from the fixed primary die 11 is a colored article having a tubular shape.

Figure 4:
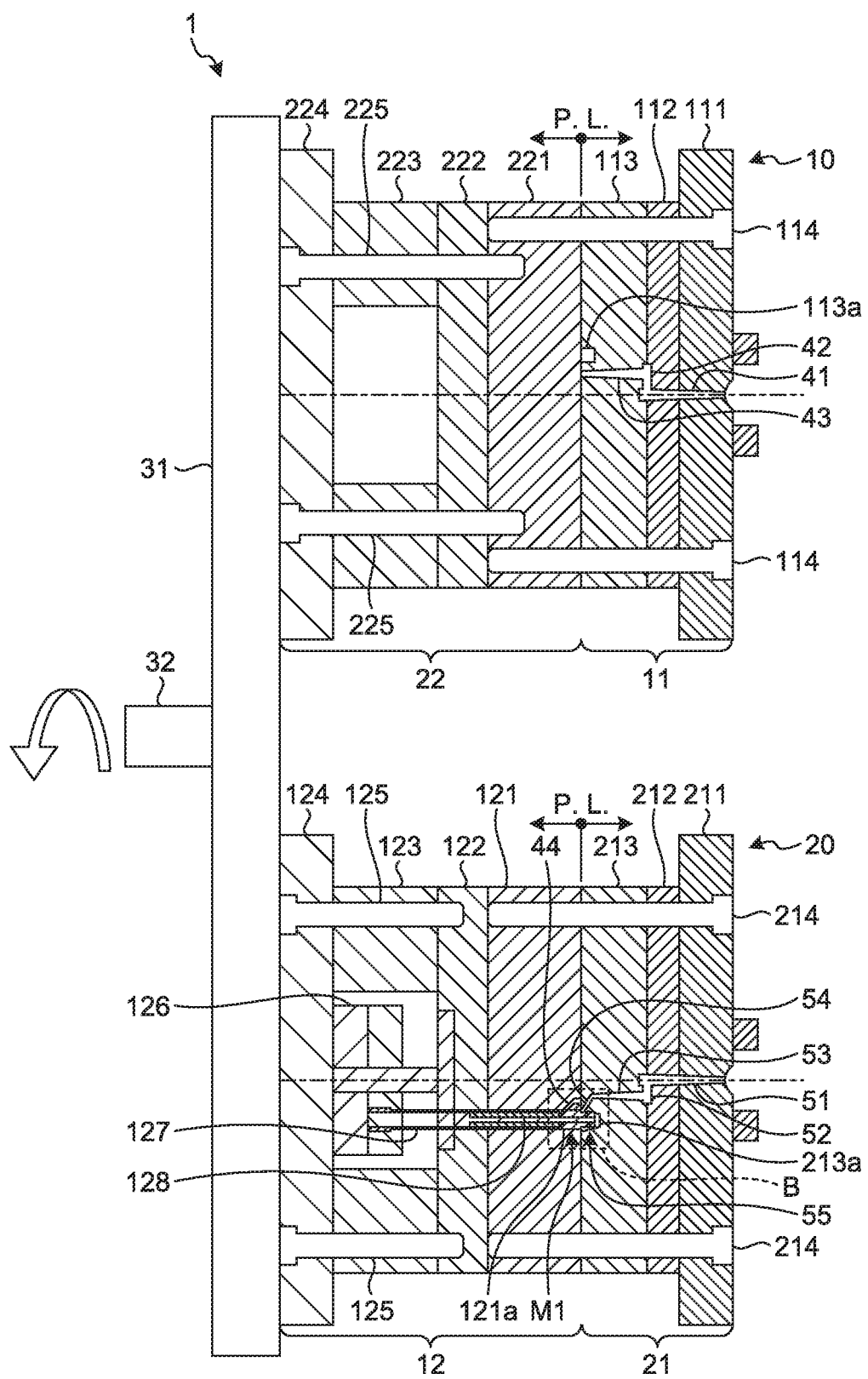
FIG. 4 is a cross-sectional view illustrating a state in which a movable die is moved to the side of a secondary molding die in the manufacturing method of two-color molded article using the two-color molding die according to the first embodiment of the disclosure.

Then, as illustrated in FIG. 4, the movable platen 31 is rotationally moved around the rotation axis 32 by 180°, so that the position of the movable die 12, in which the primary molded article M1 is held using the core pin 128, is interchanged with the position of the movable dummy die 22; and then mold closing is performed. As a result, the secondary molding cavity 55 gets formed between the concave portion 213a of the fixed secondary-side die plate 213 and the primary molded article M1 and the core pin 128. Regarding the details of the secondary molding cavity 55, the explanation is given later (see FIG. 8).

Secondary Molding Process

Figure 5:
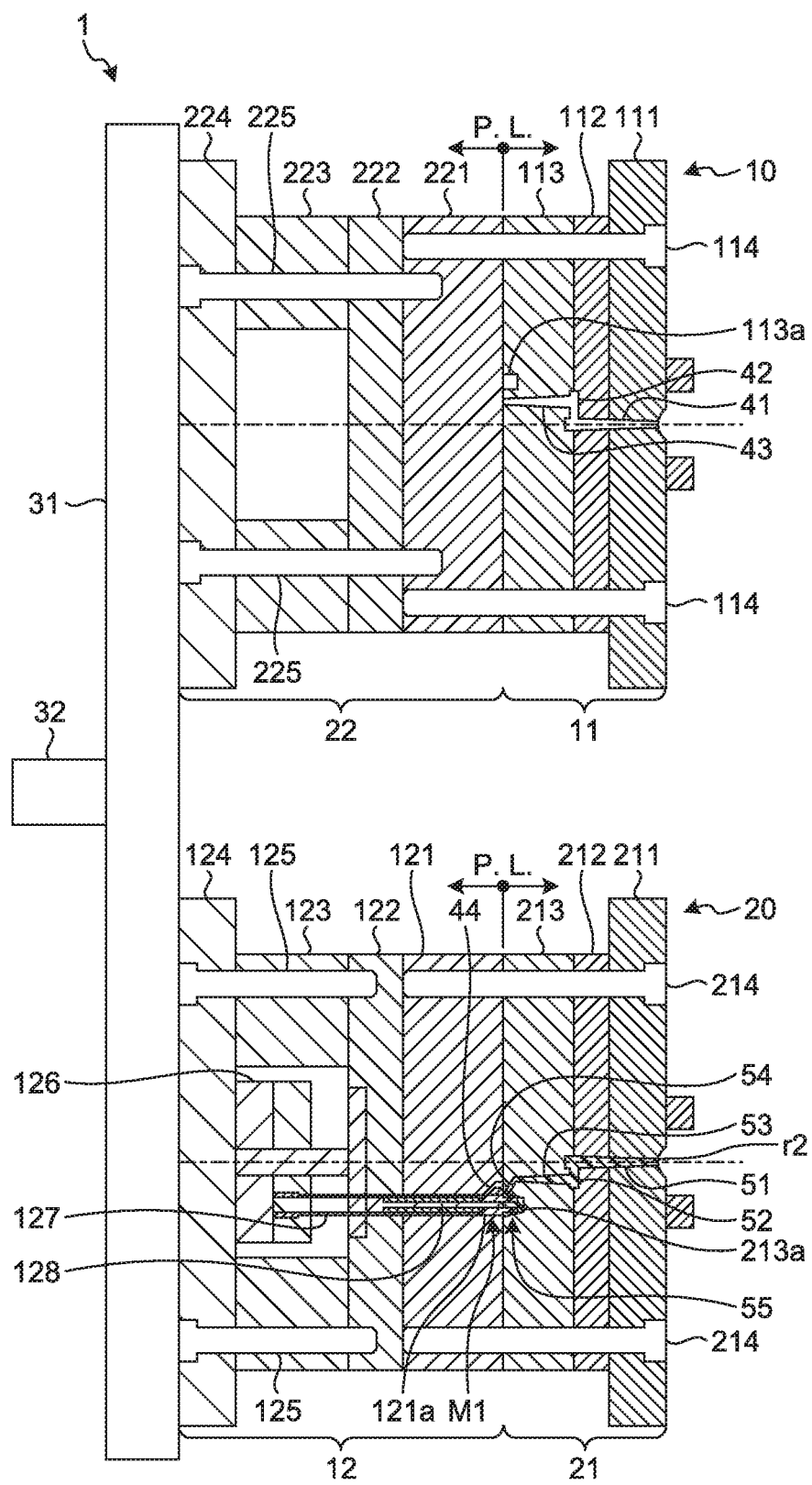
FIG. 5 is a cross-sectional view illustrating a state in which a secondary molding resin is filled in a secondary molding cavity during a secondary molding process of the manufacturing method of two-color molded article using the two-color molding die according to the first embodiment of the disclosure.

Subsequently, as illustrated in FIG. 5, in the mold-closed state of the two-color molding die 1, a transparent secondary molding resin r2 is filled in the secondary molding cavity 55 through the primary sprue 51, the runner 52, the secondary sprue 53, and the gate 54 of the fixed secondary die 21. As the secondary molding resin r2, for example, a transparent resin such as polycarbonate (PC) can be used.

Figure 6:
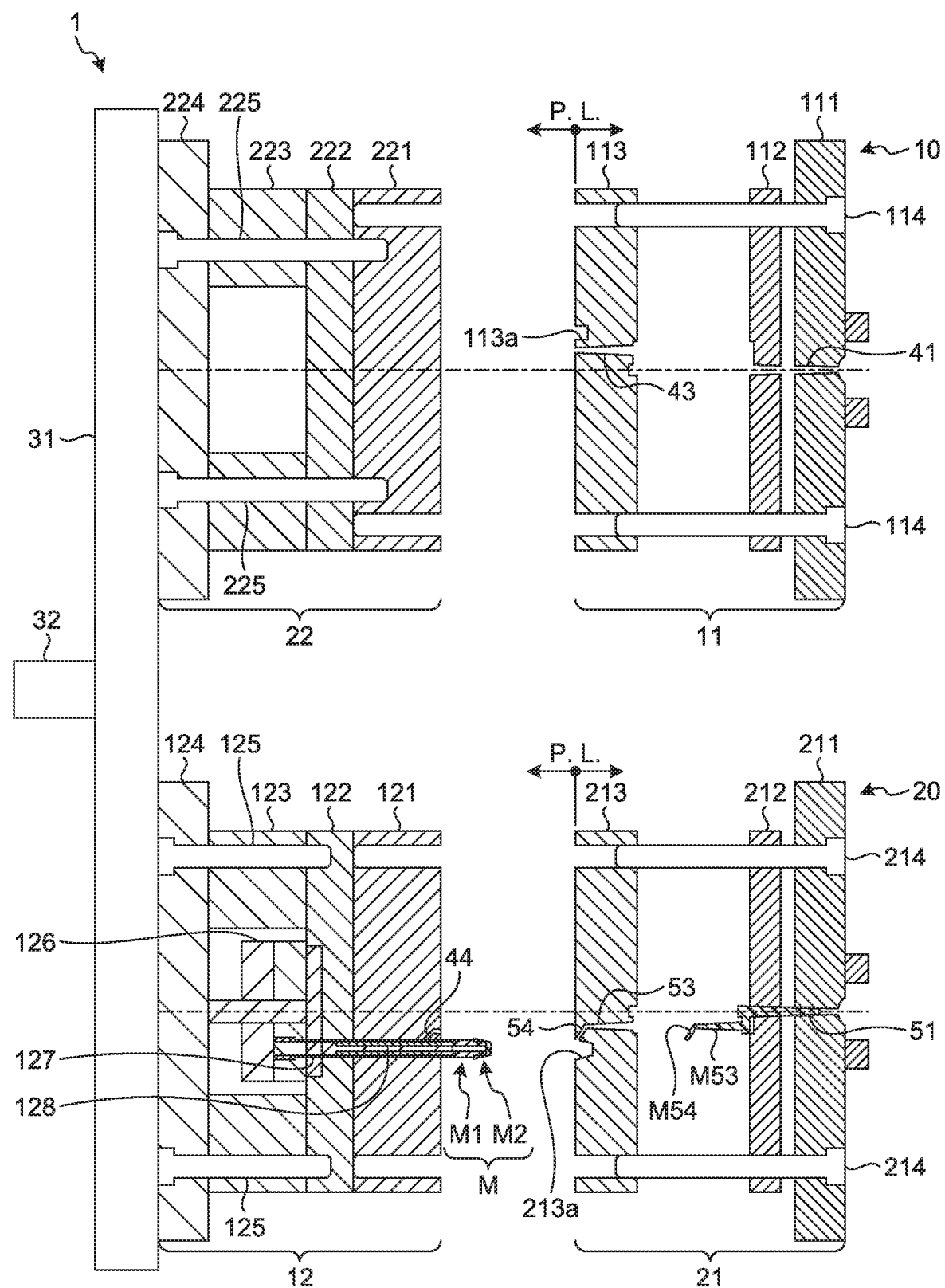
FIG. 6 is a cross-sectional view illustrating a state in which mold opening is performed during the secondary molding process of the manufacturing method of two-color molded article using the two-color molding die according to the first embodiment of the disclosure.

Then, as illustrated in FIG. 6, mold opening of the two-color molding die 1 is performed. As a result, the secondary molding resin r2, which is filled in the secondary molding cavity 55, is separated into a two-color molded article M, which is made of the primary molded article M1 and a secondary molded article M2 held in the core pin 128 of the movable die 12; and into a secondary molding sprue portion M53 and a secondary molding gate portion M54, which are held in the fixed secondary die 21.

When the ejector plate 126 moves in the P. L. direction and the two-color molded article M, which is held in the core pin 128 of the movable die 12, gets pressed by the ejector pin 127 embedded in the ejector plate 126, the two-color molded article M gets mold-released from the movable die 12. Of the two-color molded article M that is released from the movable die 12, the secondary molded article M2 is formed in a transparent color with a bottomed tubular shape and, as described later, has an optical functional surface M128a transferred thereon due to the core pin 128 (see FIG. 9).

Explained below with reference to FIGS. 7 to 10 are the details about the primary molding cavity 45 and the secondary molding cavity 55 formed in the two-color molding die 1 and about the two-color molded article manufactured according to the manufacturing method explained above.

Primary Molding Cavity

Figure 7:
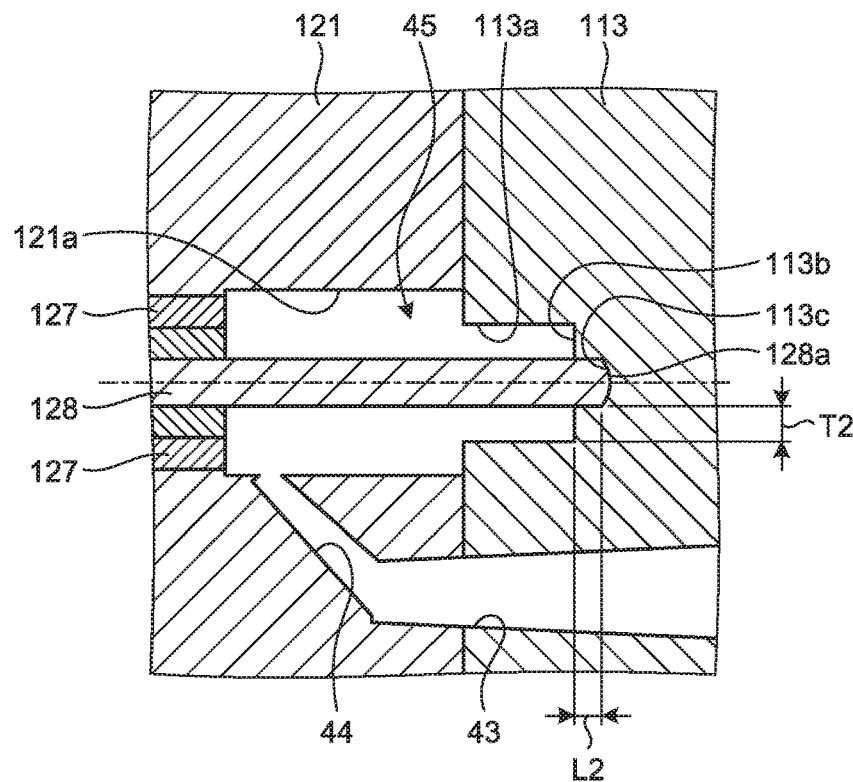
FIG. 7 is a cross-sectional view illustrating the primary molding cavity formed in the two-color molding die according to the first embodiment of the disclosure, and is an enlarged view of a portion A illustrated in FIG. 1.

FIG. 7 is an enlarged view of a portion A illustrated in FIG. 1, and in FIG. 7 is illustrated a cross-sectional shape of the primary molding cavity 45 at the time of mold closing performed in the primary molding process. The primary molding cavity 45 is made of the concave portion 121a of the movable-side die plate 121, the concave portion 113a of the fixed primary-side die plate 113, and the core pin 128.

The concave portion 121a is formed to have a columnar shape with a predetermined diameter, and is communicated with the gate 44 that is the inflow entrance of the primary molding resin r1. The concave portion 113a is formed to have a columnar shape with a smaller diameter than the concave portion 121a. Moreover, the concave portion 113a has a first base end surface 113b, and has a second base end surface 113c on which an apical surface 128a of the core pin 128 is placed.

The core pin 128 protrudes from the base end surface of the concave portion 121a of the movable-side die plate 121 toward the base end surfaces of the concave portion 113a of the fixed primary-side die plate 113 (i.e., toward the first base end surface 113b and the second base end surface 113c), and gets engaged with the second base end surface 113c of the concave portion 113a. The primary molding cavity 45, which is made of the concave portions 121a and 113a and the core pin 128 as explained above, is cylindrical in shape and has a stepped portion.

Secondary Molding Cavity

Figure 8:
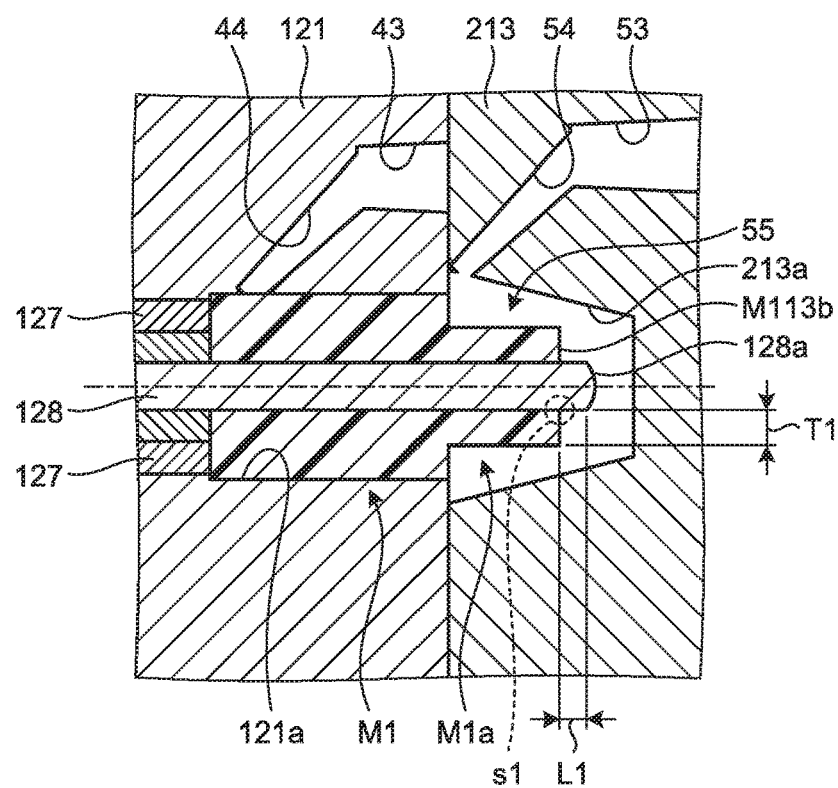
FIG. 8 is a cross-sectional view illustrating the secondary molding cavity formed in the two-color molding die according to the first embodiment of the disclosure, and is as enlarged view of a portion B illustrated in FIG. 4.

FIG. 8 is an enlarged view of a portion B illustrated in FIG. 4, and in FIG. 8 is illustrated a cross-sectional shape of the secondary molding cavity 55 at the time of mold closing performed in the secondary molding process. The secondary molding cavity 55 is formed by a distal end portion M1a including an open end M113b of the primary molded article M1; the core pin 128; and the concave portion 213a of the fixed secondary-side die plate 213.

The primary molded article M1 is formed in a tubular shape and has the core pin 128 inserted through its center. The apical surface 128a of the core pin 128 is formed to be a curved surface and protrudes from the open end M113b of the primary molded article M1. A stepped portion s1 is formed between the apical surface 128a and the open end M113b. For example, during the secondary molding, if the primary molding resin r1 present near the open end M113b of the primary molded article M1 undergoes re-melting thereby leading to dye bleeding, the stepped portion s1 functions as a resin reservoir that stems the inflow of the primary molding resin r1.

Herein, it is desirable that a protrusion length L1 from the open end M113b of the primary molded article M1 to the outer periphery of the apical surface 128a of the core pin 128 is equal to or greater than one time of a thickness T1 of the open end M113b of the primary molded article M1 in a flow direction of the secondary molding resin. As a result, the resin reservoir into which the primary molding resin r1, which has undergone re-melting at the time of dye bleeding, flows can be increased in size; thereby making it more difficult for the re-molten primary molding resin r1 to reach the optical functional surface M128a of the secondary molded article M2. Meanwhile, in order to achieve the relationship between the protrusion length L1 and the thickness T1 as explained above, as illustrated in FIG. 7, regarding the concave portion 113a of the fixed primary-side die plate 113, a length L2 from the first base end surface 113b to the second base end surface 113c can be set to be equal to or greater than one time of a radius T2 that excludes the second base end surface 113c of the concave portion 113a; and then the primary molding process can be carried out.

The concave portion 213a is formed in the shape of a truncated cone, and is communicated with the gate 54 that is the inflow entrance of the secondary molding resin r2. The concave portion 213a is placed to cover the distal end portion M1a of the primary molded article M1 and to cover the core pin 128 that protrudes from the open end M113b of the primary molded article M1. The secondary molding cavity 55 that is formed by the distal end portion M1a, the core pin 128, and the concave portion 213a as explained above has a concave shape in entirety.

Two-Color Molded Article

Figure 9:
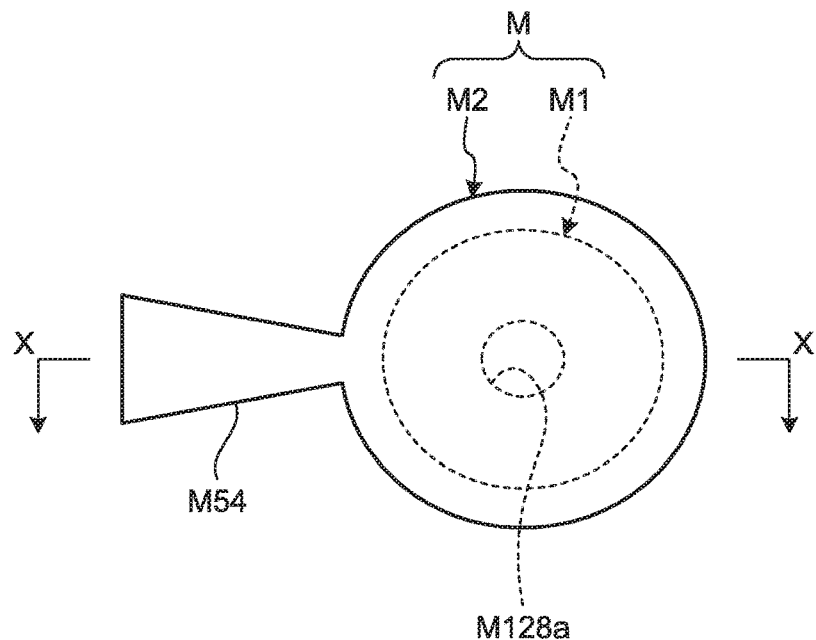
FIG. 9 is a planar view illustrating a two-color molded article that is formed using the two-color molding die according to the first embodiment of the disclosure.
Figure 10:
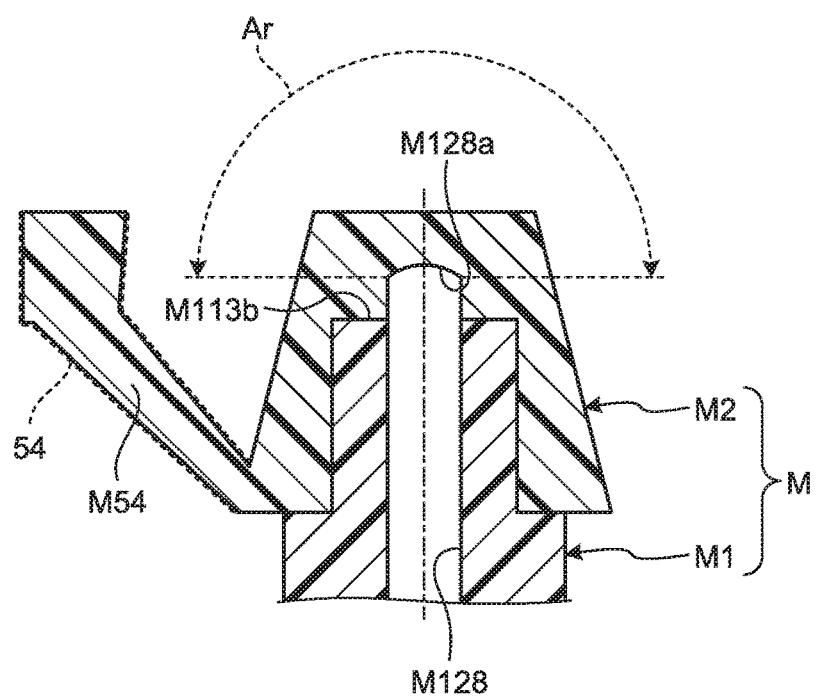
FIG. 10 is an X-X cross-sectional view of FIG. 9 and illustrates the two-color molded article that is formed using the two-color molding die according to the first embodiment of the disclosure.

In FIGS. 9 and 10 is illustrated the two-color molded article M that is formed using the two-color molding die 1. In FIGS. 9 and 10, for the purpose of illustration, the secondary molding to portion M54 is illustrated to be attached to the two-color molded article M. Moreover, in FIG. 10, the gate 54 of the fixed secondary die 21, which is meant for forming the secondary molding gate portion M54 is illustrated using dashed lines (see FIG. 8).

In the two-color molded article M, in the portion in which the core pin 128 was inserted, a hole portion M128 gets formed. In the hole portion M128, for example, a light guide is inserted that is connected to a light source device. At the distal end side of the hole portion M128, the optical functional surface M128a is transferred due to the apical surface 128a of the core pin 128.

As illustrated in FIG. 10, the gate 54 that is meant for forming the secondary molding gate portion M54 is disposed at a position other than an optical functional area Ar of the two-color molded article M, that is, at a position that does not block the optical functional area Ar. Herein, the optical functional area Ar implies a predetermined angle domain including the optical functional surface M128a of the secondary molded article M2. The specific angle domain of the optical functional area Ar differs according to the type of the insertion (for example a light guide) that is inserted in the hole portion M128. In FIGS. 9 and 10, an example is illustrated in which the optical functional area Ar has the angle domain of 180°.

In this way, as a result of disposing the gate 54 at a position away from the optical functional area Ar, in the secondary molding process, the secondary molding resin r2 flows into the secondary molding cavity 55 from a position away from the optical functional area Ar. For that reason, the primary molding resin r1 present near the optical functional area Ar does not easily re-melt and dye bleeding does not easily occur. Moreover, even if dye bleeding occurs, there is a decrease in the amount of re-melting of the primary molding resin r1. Meanwhile, in the first embodiment, as illustrated in FIG. 4, although the gate 54 is disposed on the side of the fixed secondary die 21, if the gate 54 is disposed on the side of the movable die 12, it becomes possible to further reduce the occurrence of dye bleeding.

According to the two-color molding die 1 and the manufacturing method of the two-color molded article M using the two-color molding die 1 as explained above in the first embodiment, at the time of mold closing of the fixed secondary die 21 and the movable die 12, the stepped portion s1 that functions as the resin reservoir is formed between the apical surface 128a of the core pin 128 and the open end M113b of the primary molded article M1. Hence, for example, during secondary molding, when the primary molding resin r1 that is present near the open end M113b of the primary molded article M1 undergoes re-melting thereby leading to dye bleeding, the primary molding resin r1 flows into the stepped portion s1 and thus does not easily reach the apical surface 128a of the core pin 128, that is, does not easily reach the optical functional surface M128a of the secondary molded article M2. Hence, it becomes possible to prevent a situation in which the optical functional surface M128a of the secondary molded article M2 of a transparent color gets blocked by the re-molten and colored primary molding resin r1. That enables securing the transparency of the second molded article M2.

Second Embodiment

Figure 11:
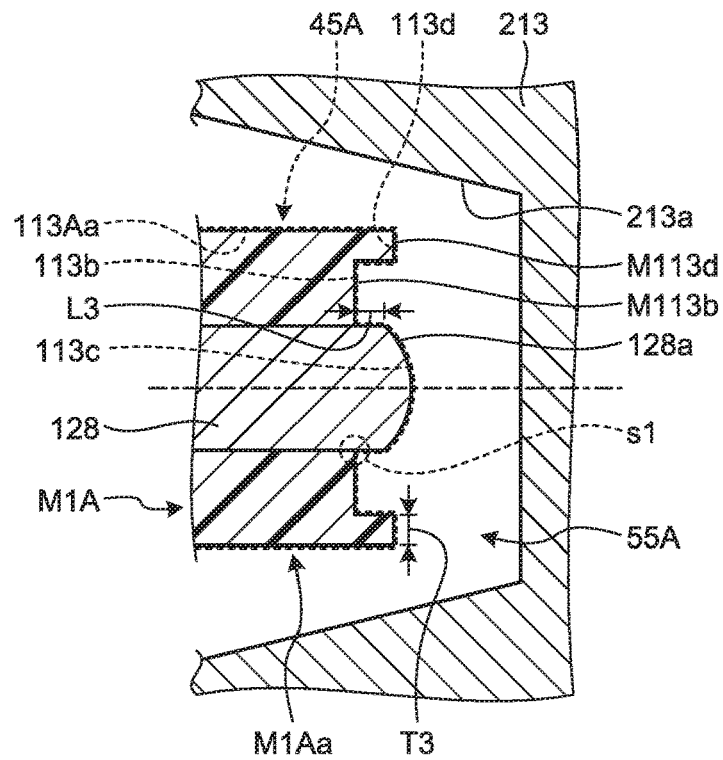
FIG. 11 is a cross-sectional view illustrating a primary molding cavity and a secondary molding cavity formed in a two-color molding die according to a second embodiment of the disclosure.

Regarding a two-color molding die according to a second embodiment of the disclosure, the explanation is given below with reference to FIG. 11. In the second embodiment, except for the configuration of a primary molding cavity 45A and a secondary molding cavity 55A, the configuration is identical to the configuration of the two-color molding die 1 according to the first embodiment. Hence, in FIG. 11, except for the configuration related to the primary molding cavity 45A and the secondary molding cavity 55A, no other configuration is illustrated. In FIG. 11 is illustrated a cross-sectional shape of the secondary molding cavity 55A at the time of mold closing performed in the secondary molding process. Moreover, for the purpose of illustration, some part of the primary molding cavity 45A too is illustrated using dashed lines.

The secondary molding cavity 55A is formed by a distal end portion M1Aa including the open end M113b of a primary molded article M1A; the core pin 128; and the concave portion. 213a of the fixed secondary-side die plate 213. On the outer edge of the open end M113b of the primary molded article M1A, protruding portions M113d are disposed in series along the circumferential direction. That is, in the two-color molding die according to the second embodiment, on the outer edge of the first base end surface 113*b* of a concave portion 113Aa formed in the fixed primary-side die plate 113, depressed portions 113*d* that are meant for forming the protruding portions M113*d* of the primary molded article M1A are formed in series along the circumferential direction. Then, in the primary molding process, as a result of filling the primary molding resin r1 in the primary molding cavity 45A formed due to the concave portion 113Aa, the primary molded article MIA having the protruding portions M113*d* is formed.

Herein, it is desirable that a protrusion length 13 from the open end M113*b* of the primary molded article M1A to the outer periphery portion of the apical surface 128*a* of the core pin 128 is equal to or greater than one time of a thickness 13 of the protruding portions M113*d* of the primary molded article M1A. As a result, the resin reservoir into which the primary molding resin r1, which has undergone re-melting at the time of dye bleeding, flows can be increased in size; thereby making it more difficult for the re-molten primary molding resin r1 to reach the optical functional surface M128*a* of the secondary molded article M2. Meanwhile, in order to achieve the relationship between the protrusion length L3 and the thickness T3 as explained above, regarding the concave portion 113Aa of the fixed primary-side die plate 113, the length from the first base end surface 113*b* to the second base end surface 113*c* can be set to be equal to or greater than one time of the depressed portions 113*d*; and then the primary molding process can be carried out.

According to the two-color molding die and the manufacturing method of the two-color molded article M using the two-color molding die as explained above in the second embodiment, for example, if dye bleeding occurs during secondary molding, the primary molding resin r1 flows into the stepped portion s1 and does not easily reach the optical functional surface M128*a* of the secondary molded article M2. Hence, it becomes possible to prevent a situation in which the optical functional surface M128*a* of the secondary molded article M2 of a transparent color gets blocked by the re-molten and colored primary molding resin r1. That enables securing the transparency of the second molded article M2.

Moreover, in the two-color molded article manufactured according to the second embodiment, since the protruding portions M113*d* are formed in the primary molded article M1A, the optical functional surface M128*a* (see FIG. 10) has only a small protrusion amount with respect to the primary molded article MIA. Thus, when an insertion (for example, a light guide) is inserted in the hole portion M128 (see FIG. 10) of the manufactured two-color molded article, the insertion gets blocked by the colored primary molded article M1A and does not get exposed to the outside, thereby leading to an enhancement in the external appearance.

Third Embodiment

Figure 12:
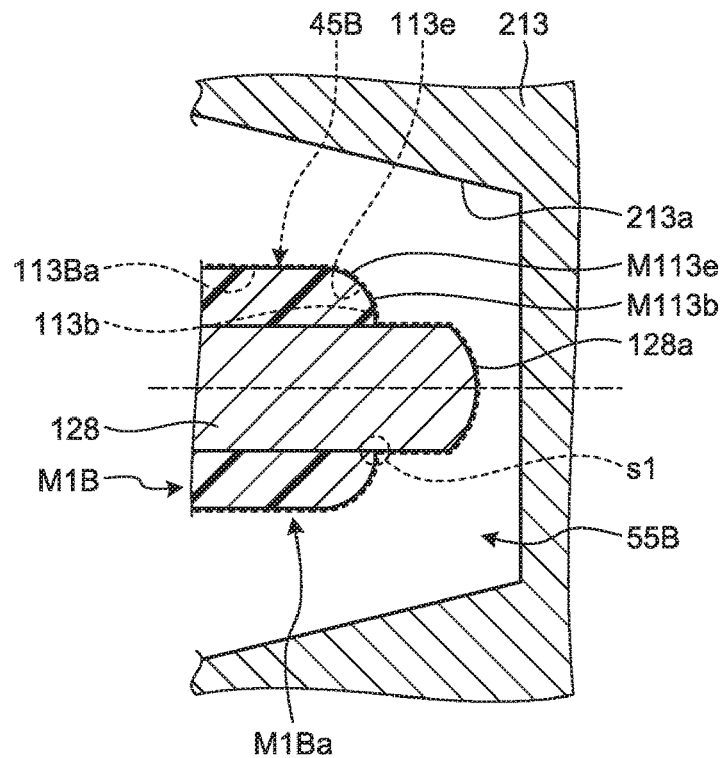
FIG. 12 is a cross-sectional view illustrating a primary molding cavity and a secondary molding cavity formed in a two-color molding die according to a third embodiment of the disclosure.

Regarding a two-color molding die according to a third embodiment of the disclosure, the explanation is given below with reference to FIG. 12. In the third embodiment, except for the configuration of a primary molding cavity 45B and a secondary molding cavity 55B, the configuration is identical to the configuration of the two-color molding die 1 according to the first embodiment. Hence, in FIG. 12, except for the configuration related to the primary molding cavity 45B and the secondary molding cavity 55B, no other configuration is illustrated. In FIG. 12 is illustrated a cross-sectional shape of the secondary molding cavity 55B at the time of mold closing performed in the secondary molding process. Moreover, for the purpose of illustration, some part of the primary molding cavity 45B too is illustrated using dashed lines.

The secondary molding cavity 55B is made of a distal end portion M1Ba including the open end M113*b* of a primary molded article M1B; the core pin 128; and the concave portion 213*a* of the fixed secondary-side die plate 213. The outer edge of the open end M113*b* of the primary molded article M1B is formed to be a curved surface and has curved surface portions M113*e* formed therein in series along the circumferential direction. That is, in the two-color molding die according to the third embodiment, on the outer edge of the first base end surface 113*b* of a concave portion 113Ba formed on the fixed primary-side die plate 113, curved surface portions 113*e* meant for forming the curved surface portions M113*e* of the primary molded article M1B are formed in series along the circumferential direction. Then, in the primary molding process, as a result of filling the primary molding resin r1 in the primary molding cavity 45B formed due to the concave portion 113Ba; the primary molded article M1B having the curved surface portions M113*e* is formed.

According to the two-color molding die and the manufacturing method of the two-color molded article M using the two-color molding die as explained above in the third embodiment, for example, if dye bleeding occurs during secondary molding, the primary molding resin r1 flows into the stepped portion s1 and does not easily reach the optical functional surface M128*a* of the secondary molded article M2. Hence, it becomes possible to prevent a situation in which the optical functional surface M128*a* of the secondary molded article M2 of a transparent color gets blocked by the re-molten and colored primary molding resin r1. That enables securing the transparency of the second molded article M2.

Moreover, according to the third embodiment, as a result of forming the curved surface portions M113*e* at the outer edge of the open end M113*b* of the primary molded article M1B that is a part in which dye bleeding is easy to occur, the concentration of the shear stress that occurs when the secondary molding resin r2 flows into the secondary molding cavity 55B can be dispersed because of the curved surface portions M113*e*. As a result, the primary molding resin r1 does not easily undergo re-melting, and the occurrence of dye bleeding can be reduced.

Fourth Embodiment

Figure 13:
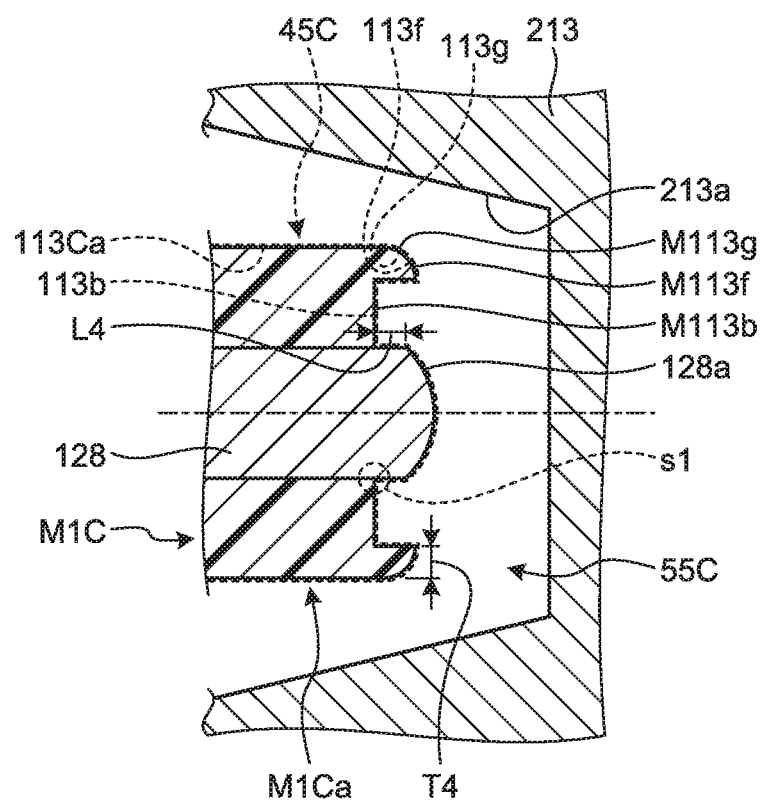
FIG. 13 is a cross-sectional view illustrating a primary molding cavity and a secondary molding cavity formed in a two-color molding die according to a fourth embodiment of the disclosure.

Regarding a two-color molding die according to a fourth embodiment of the disclosure, the explanation is given below with reference to FIG. 13. In the fourth embodiment, except for the configuration of a primary molding cavity 45C and a secondary molding cavity 55C, the configuration is identical to the two-color molding die 1 according to the first embodiment. Hence, in FIG. 13, except for the configuration related to the primary molding cavity 45O and the secondary molding cavity 55C, no other configuration is illustrated. In FIG. 13 is illustrated a cross-sectional shape of the secondary molding cavity 55O at the time of mold closing performed in the secondary molding process. Moreover, for the purpose of illustration, some part of the primary molding cavity 45C too is illustrated using dashed lines.

The secondary molding cavity 55O is made of a distal end portion M1Ca including the open end M113*b* of a primary molded article 1; the core pin 128; and the concave portion 213a of the fixed secondary-side die plate 213. On the outer edge of the open end M113b of the primary molded article M1C, protruding portions M113f are formed in series along the circumferential direction. Moreover, on the outer edge of the protruding portions M113f, curved surface portions M113g are formed. That is, in the two-color molding die according to the fourth embodiment, on the outer edge of the first base end surface 113b of a concave portion 113Ca formed in the fixed primary-side die plate 113, depressed portions 113f that are meant for forming the protruding portions M113f of the primary molded article M1C are formed in series along the circumferential direction.

Moreover, on the outer edge of the depressed portions 113f, curved surface portions 113g are formed. Then, in the primary molding process, as a result of filling the primary molding resin r1 in the primary molding cavity 45C formed due to the concave portion 113Ca; the primary molded article M1C having the protruding portions M113f and the curved surface portions 113g is formed.

Herein, in an identical manner to the second embodiment, it is desirable that a protrusion length L4 from the open end M113b of the primary molded article M1C to the outer periphery portion of the apical surface 128a of the core pin 128 is equal to or greater than one tame of a thickness T4 of the protruding portions M113f of the primary molded article M1C.

According to the two-color molding die and the manufacturing method of the two-color molded article M using the two-color molding die as explained above in the fourth embodiment, for example, if dye bleeding occurs during secondary molding, the primary molding resin r1 flows into the stepped portion s1 and does not easily reach the optical functional surface M128a of the secondary molded article M2. Hence, it becomes possible to prevent a situation in which the optical functional surface M128a of the secondary molded article M2 of a transparent color gets blocked by the re-molten and colored primary molding resin r1. That enables securing the transparency of the second molded article M2.

Moreover, according to the fourth embodiment, in an identical manner to the second embodiment, when an insertion (for example, a light guide) is inserted in the hole portion M128 (see FIG. 10) of the manufactured two-color molded article, the insertion does not get exposed to the outside, thereby leading to an enhancement in the external appearance. Furthermore, in an identical manner to the third embodiment, the concentration of the shear stress that occurs when the secondary molding resin r2 flows into the secondary molding cavity 55C can be dispersed because of the curved surface portions M113g. As a result, the primary molding resin r1 does not easily undergo re-melting, and the occurrence of dye bleeding can be reduced.

Imaging Device

The two-color molded article M that is formed using the two-color molding die according to the embodiments described above can be implemented in an imaging device in particular. The imaging device includes an optical functional component (i.e., the two-color molded article M) including a secondary molded article (i.e., the secondary molded article M2) in which a tubular portion of a primary molded article (i.e., one of the primary molded articles M1, M1A, M1B, and M1C) that has been formed by a non-optical functional resin (i.e., the primary molding resin r1) is covered by an optical functional resin (i.e., the secondary molding resin r2). The optical functional component includes an optical functional area (i.e., the optical functional area Ar) formed from the optical functional surface at the distal end side of the tubular portion of the primary molded article (i.e., the optical functional surface M128a) to the outer surface of the secondary molded article. Moreover, in the imaging device, the thickness of the distal end of the tubular portion of the primary molded article (i.e., one of the thicknesses T1, T3, and T4) is set to be equal to or greater than one time of the distance (i.e., one of the distances L1, L3, and L4) between the distal end of the inner radius portion of the tubular portion of the primary molded article (i.e., the open end M113b) and the inside effective diameter of the optical functional surface (i.e., the outermost edge of the optical functional surface M128a).

According to the disclosure, when the movable die is closed with respect to the fixed secondary die, a stepped portion that functions as a resin reservoir is formed between the apical surface of the core pin and the open end of the primary molded article. Hence, for example, if dye bleeding occurs during secondary molding, the primary molding resin flows into the stepped portion and does not easily reach the apical surface of the core ping, that is, the optical functional surface of the secondary molded article. Hence, it becomes possible to prevent a situation in which the optical functional surface of the secondary molded article of a transparent color gets blocked by the re-molten and colored primary molding resin. That enables securing the transparency of the second molded article.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising an optical functional component including a primary molded article and a secondary molded article,
   the primary molded article being formed from a non-optical functional resin in a primary molding, and at least part of the primary molded article having a tubular shape portion,
   the secondary molded article being formed from an optical resin in a secondary molding, the secondary molded article covering at least a part of the tubular shape portion of the primary molded article,
   the secondary molded article having an optical functional surface located at a position more distal than a distal end of the tubular shape portion along an axial direction of the tubular shape portion, and
   the optical functional component including an optical functional area ranging from the optical functional surface to an outer surface of the secondary molded article,
   wherein a distance from a hole at the distal end of the tubular shape portion to an outermost edge of the optical functional surface is at least equal to a wall thickness of the distal end of the tubular shape portion.

* * * * *